United States Patent [19]
Grahl et al.

[11] 4,059,297
[45] Nov. 22, 1977

[54] TUBE COUPLING

[75] Inventors: Darwin R. Grahl; Cary Haramoto, both of Newark, N.Y.

[73] Assignee: Parker-Hannifin Corporation, Cleveland, Ohio

[21] Appl. No.: 664,532

[22] Filed: Mar. 8, 1976

[51] Int. Cl.$^2$ ............................................. F16L 19/08
[52] U.S. Cl. .................................... 285/340; 285/341; 285/382.7
[58] Field of Search ................. 285/340, 341, DIG. 3, 285/23, 404, 382.7; 85/36

[56] References Cited

U.S. PATENT DOCUMENTS

| | | | |
|---|---|---|---|
| 2,459,251 | 1/1949 | Stillwagon | 285/112 |
| 2,484,192 | 10/1949 | Squiller | 285/340 X |
| 3,291,510 | 12/1966 | Kody | 285/340 |
| 3,499,671 | 3/1970 | Osborne | 285/341 |
| 3,879,065 | 4/1975 | Kobayashi | 285/340 X |

FOREIGN PATENT DOCUMENTS

| | | | |
|---|---|---|---|
| 1,275,078 | 9/1961 | France | 151/30 |
| 51,558 | 2/1943 | France | 285/340 |

*Primary Examiner*—Dave W. Arola
*Attorney, Agent, or Firm*—John N. Wolfram

[57] ABSTRACT

A coupling for unflared tubes comprising a body with a nut threadably connected thereto so as to form a chamber therebetween, a deformable gripping and sealing sleeve in the chamber and being undeformed when the nut and body are partially threaded together so that an unflared tube may be inserted into the nut, body and sleeve to a position where it may be gripped and sealed by the sleeve upon deformation of the latter by further threading of the nut upon the body. The nut has mounted therein a ring of flexible spring metal slotted so as to form fingers whose radially inner ends are initially on a diameter smaller than the outside diameter of the tube and bendable by insertion of the tube therethrough while the sleeve is undeformed so as to grip the tube by spring action to prevent withdrawal of the tube, as by gravity, and thus to hold the same in its proper position for being gripped by the deformable sleeve upon final tightening of the nut upon the body.

1 Claim, 5 Drawing Figures

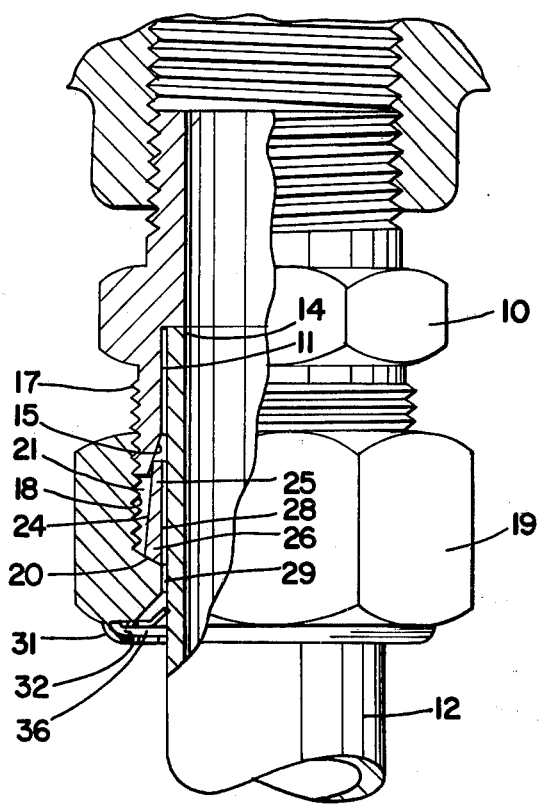
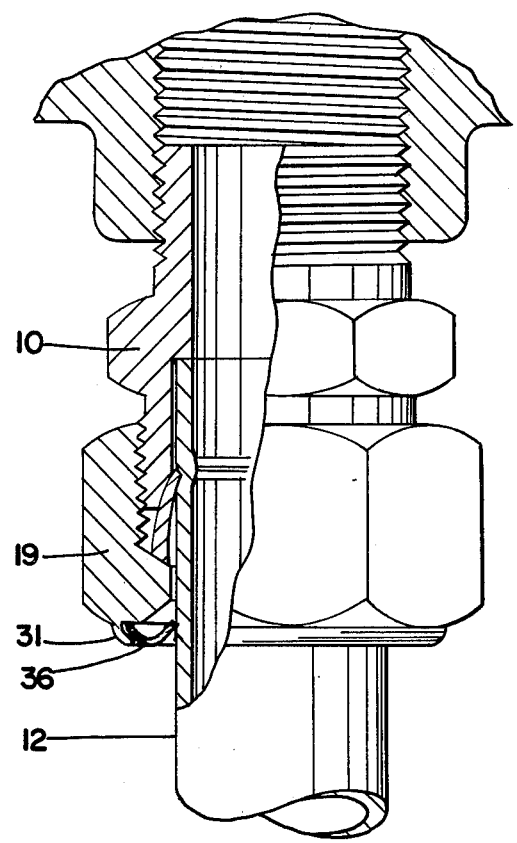
Fig. 1
Fig. 2
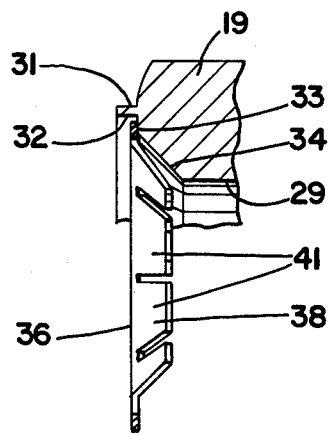
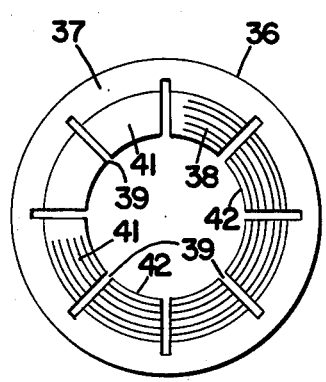
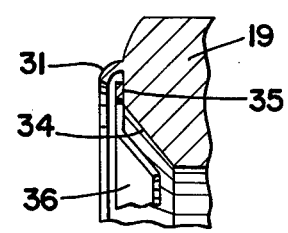
Fig. 4
Fig. 3
Fig. 5

TUBE COUPLING

Background of the Invention

Couplings for flareless tubes, such as shown in U.S. Letters Patent 3,499,671, which include a deformable metal sleeve between a nut and body having threaded engagement with each other, have many uses in industry. This type of coupling is particularly convenient to use because the nut, body and sleeve can be preassembled to a finger-tight position wherein the sleeve remains undeformed and in which finger-tight condition the tube may readily inserted through the nut and sleeve and into the body whereupon the installer need only tighten the nut upon the body to deform the sleeve into gripping and sealing engagement with the tube.

However, in some installations the fitting body, with the nut and sleeve in finger-tight position thereon, must be connected to a housing or panel prior to installation of the tube and in a vertical position in which the nut is lowermost. Now, when the tube is inserted it must be held in its proper position by the workman until the nut is tightened upon the coupling body for deforming the sleeve into tight gripping engagement with the tube. It is not always convenient for the workman to hold the tube during tightening of the nut in a manner to prevent the tube from slipping out of the coupling, either completely or partially.

In other cases, such as assembly line production of assembled tubes, the tube may be inserted into the loosely assembled coupling at one station and the nut tightened at another and the tube may partially withdraw during handling between the two stations.

In either case, the tube may not be in its proper position for final tightening of the nut with the result that the tube may not be securely gripped or sealed.

SUMMARY OF THE INVENTION

The present invention overcomes the above problems by providing a second gripping member in the form of a ring attached to the outer end of the nut and being slotted to form fingers whose radially inner ends are initially smaller in diameter than the tube outside diameter and which are bendable by insertion of the tube therethrough. The fingers are inclined so that they will be readily expandable to the outside diameter of the tube upon insertion of the latter but retain a grip upon the tube by spring action of the fingers. This spring action, plus the inclination of the fingers, is such that the fingers will tend to straighten out for increasing the security of the grip upon the tube when the tube attempts to move in a direction for withdrawing the same from the coupling. Thus, when the tube is inserted to its proper position within the coupling for final tightening of the nut upon the body, the slotted ring will effectively hold the tube in this position so that the workman can tighten the nut without at the same time holding the tube in its proper position.

In this coupling, the deformable sleeve is a heavier member than the slotted ring and provides the main grip upon the tube when the coupling is fully assembled. The slotted ring is mounted within a recess in the nut so as to be permanently retained therein but has slight radial and axial clearance in the recess so that the nut can rotate relative to the slotted ring when the latter grips the tube. In addition, the slotted ring is thin and flexible and bears against the nut only at a location close to its outer periphery so that the slotted ring, when the radially inner edges of the fingers are in gripping engagement with the tube, may bend between its inner and outer diameters during travel of the nut along the tube during final tightening of the nut upon the coupling body.

DETAIL DESCRIPTION

FIG. 1 is a view, partly in cross section, of the coupling with the parts in the finger-tight position and the tube inserted therein.

FIG. 2 is a view like FIG. 1 but showing the coupling parts in the fully tightened condition.

FIG. 3 is an end view of the slotted ring.

FIG. 4 is a side view of the slotted ring and a fragmentary section view of the nut in its initial condition for receiving the ring.

FIG. 5 is a fragmentary section view showing how the nut retains the slotted ring with slight radial and axial clearance therewith.

The coupling comprises a body 10 having a bore 11 of a size to receive a tube 12 with a small clearance therewith. The body has a stop shoulder 14 at the inner end of bore 11 and an outwardly flared camming surface 15 at the other end. The body also has an external thread 17 for threadably engaging an internally threaded bore 18 in a nut 19. At the inner end of threaded bore 18 the nut has a tapered shoulder 20 forming one end of a chamber 21 formed between the nut and body 10 when the parts are threaded together and which chamber receives a deformable metal sleeve 24 whose front end 25 engages flare mouth 15 and whose back end 26 engages nut shoulder 20. The sleeve and nut have bores 28, 29 therethrough of approximately the same diameter as body bore 11 so as to have an initial slight clearance with the outside diameter of tube 12.

As shown in FIG. 3, the back end of nut 19 is initially formed with a thin projecting cylindrical portion 31 that forms a recess 32. The inner wall of this recess has a transverse portion 33 that intersects a chamfered portion 34 having an angle of approximately 45° with the longitudinal axis of the nut.

Mounted within recess 32 is a ring 36 of thin flexible spring steel. It has a radially outer portion 37 lying in a plane perpendicular to the longitudinal axis of the ring and a radially inner portion 38 that is initially at an angle of about 45° to the longitudinal axis. The ring has circumferentially spaced slots 39 that extend completely through slanted inner portion 38 and partially into outer portion 37 so as to form flexible fingers 41 whose radially inner ends 42 initially lie in a circle whose diameter is slightly less than the outside diameter of tube 12. The thickness of ring 36 is approximately 0.010 inch and the material is preferably stainless steel so that the fingers 38 will readily flex radially outwardly to permit the tube to pass therethrough when moved in a direction from left to right with relation to FIG. 3 but which have considerable spring tension for maintaining the fingers in engagement with the tube.

Ring 36 is receivable within nut recess 32 as shown in FIG. 3. Lip 31 is then rolled over in the manner shown in FIG. 1 for retaining the ring upon the nut. Lip 31, when in the rolled-over condition shown in FIG. 1 loosely confined ring 36 in both axial and radial directions so that when the ring is in gripping engagement with the tube, nut 19 is freely rotatable relative to the ring. Also, the rolled-over lip 31 provides a rear wall for the recess that radially overlaps ring portion 37 by only a small amount, such as about 0.020 inch diametrally, but preferably no more than about one-eighth the initial radial width of the ring between its inner and outer margins, so that lip 31 will not interfere with bending of ring portions 37 and fingers 38 when the fingers have gripped the tube and the nut is advanced along the tube to its final threaded position upon body 10. Nut chamfer 34 is formed so that it will form a substantial clearance with fingers 38 and not interfere with flexing of the latter radially outwardly when the tube is inserted. In furtherance of this objective transverse inner wall 35 of recess 32 is of narrow radial width so that it also radially overlaps ring 36 by no more than about one-eighth the initial radial width of ring 36.

Mounting of the ring 36 in the nut by spinning or crimping over lip 31 is accomplished at the factory where the nut and sleeve is then assembled to the finger-tight position shown in FIG. 1 prior to shipment of the coupling assembly to the customer. When the coupling is to be installed, the body 10, with the nut and sleeve in the finger-tight position, is first attached to the housing or other member 16 to which a tube is to be connected. The tube 12 is then inserted through ring 36, nut 19 and sleeve 24 into body bore 11 until it seats against body shoulder 14. As the tube passes through ring 36, it spreads fingers 38 radially outwardly but the spring tension in the fingers causes the fingers to remain in contact with the outer surface of the tube. If gravity or some other force is then applied to the tube in a direction to withdraw it from the coupling, fingers 38 dig into the tube and a force is applied to the fingers tending to swing them toward a transverse plane. This causes the fingers to increase their grip upon the tube and prevent its withdrawal so that the tube will be held by ring 36 in the position shown in FIG. 1 with the inner end of the tube either in contact with body shoulder 14 or perhaps spaced a few thousandths of an inch therefrom.

The nut 19 may then be threaded further onto body 10 to move sleeve 24 toward body 10 so that the inner end of the sleeve will be contracted by flare mouth 15 into gripping and sealing engagement with the tube. Upon initial contact of the forward end of sleeve 24 with the tube the sleeve will move the tube inwardly so as to take up any slight clearance that may have existed between the end of the tube and body shoulder 14 and thereafter the sleeve will move relative to the tube as the front end contracts radially until the sleeve is in its final position.

As nut 19 is threaded toward its final position on body 10, sleeve 36 will be moved forwardly with it. During such movement, fingers 38 will assist in moving the tube inwardly to take up any slight clearance between the end of the tube and shoulder 14. After such engagement, fingers 38 will tend to straighten out and dig more tightly into the tube but because the tube is now bottomed against shoulder 14, there will be resistance to axial movement of the radially inner ends of fingers 38 as the nut continues to move axially. Because the ring 36 is very thin and is flexible, it may bend somewhat as shown in FIG. 2, or it may be scraped inwardly along the tube, depending upon the material of the tube and its hardness for resisting embedding of the fingers into the surface of the tube.

Because of the thinness and flexibility of the ring 36, the latter may bend in the manner shown in FIG. 2 with but a small portion of the wrench torque that is required to be exerted upon nut 19 for driving sleeve 24 to its contracted position. This is important because sleeve 24 is relied upon to provide both the main gripping force upon the tube to retain it in the coupling and for having tight sealing contact with both the tube and body flare mouth 15. If too much of the wrench torque is absorbed by ring 36, nut 19 might not be moved sufficiently far onto body 10 to properly deform sleeve 24 into its gripping and sealing position. Thus, it is preferable that no more than about one-fourth of the wrench torque applied to nut 19 for threading it into its final position on body 10 be absorbed in the moving and bending ring 36 so that at least about three-fourths of such wrench torque is utilized for moving and deforming sleeve 24.

As a practical matter, initial tightening movement of the nut after insertion of the tube into the coupling will cause ring 36 to move the tube inwardly for taking up any slight clearance that might exist between the end of the tube and shoulder 14 before sleeve 24 has been moved forwardly a sufficient distance to grip and move the tube. Thus, ring 36 functions to not only initially support the tube in its approximately correct position within the coupling but also functions to move the tube to such correct position before sleeve 24 is deformed into engagement with the tube so that sleeve 24 in turn will function correctly.

Although the coupling as illustrated in the drawings and thus far described utilizes an external thread upon the body member 10 and an internal thread in nut 19, it is obvious that these could be reversed so that the body has an internal thread axially outwardly of flare mouth 15 and that nut 19 have an external thread rearwardly of shoulder 20. Also, the threaded connection between the nut and body could be supplanted by flanges on the same and with bolts through the flanges utilized for drawing the nut and body parts together.

I claim:

1. A coupling for tubes comprising a body having a bore for receiving a tube, a nut, adjustable interengaging means on the nut and body operable for moving the nut toward the body, said nut and body when interengaged forming a chamber closed at its axially outward end, a deformable sleeve within said chamber, said nut and sleeve each having a bore for receiving the tube, said sleeve being engageable with the nut and body so as to be actuated and deformed thereby into gripping engagement with the tube, and a metal member carried by the nut axially outwardly of said chamber and being operable independently of actuation of the sleeve for engaging and holding the tube within the nut and sleeve prior to actuation and deformation of the sleeve into gripping engagement with the tube, said sleeve providing the main grip upon the tube when deformed by the nut as aforesaid said member being spaced from said sleeve and at all times out of contact therewith.

* * * * *